(12) United States Patent
Rappaport et al.

(10) Patent No.: US 7,773,995 B2
(45) Date of Patent: Aug. 10, 2010

(54) METHOD AND APPARATUS FOR UTILIZING RF SIGNALS TO CREATE A SITE SPECIFIC REPRESENTATION OF AN ENVIRONMENT (75) Inventors: Theodore Rappaport, Austin, TX (US); Roger Skidmore, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 644 days.

(21) Appl. No.: 11/405,167

(22) Filed: Apr. 17, 2006

(65) Prior Publication Data
US 2007/0099622 A1 May 3, 2007

Related U.S. Application Data (60) Provisional application No. 60/672,075, filed on Apr. 18, 2005.

(51) Int. Cl.
*H04W 40/00* (2009.01)
(52) U.S. Cl. ............... 455/446; 455/452.2; 455/422.1; 455/423
(58) Field of Classification Search ......... 455/446, 455/452.2, 422.1, 423, 424
See application file for complete search history.

(56) References Cited

U.S. PATENT DOCUMENTS

| 4,392,137 | A | 7/1983 | Intlekofer et al. |
| 4,817,012 | A | 3/1989 | Cali |
| 4,843,459 | A | 6/1989 | Perrin et al. |
| 4,885,694 | A | 12/1989 | Pray |
| 5,111,392 | A | 5/1992 | Malin |
| 5,119,307 | A | 6/1992 | Blaha |
| 5,239,487 | A | 8/1993 | Horejsi |
| 5,293,640 | A | 3/1994 | Gunmar |
| 5,307,261 | A | 4/1994 | Maki |
| 5,339,184 | A | 8/1994 | Tang |
| 5,375,123 | A | 12/1994 | Andersson |
| 5,394,522 | A | 2/1995 | Sanchez-Frank |
| 5,414,429 | A | 5/1995 | Giraudy |
| 5,463,464 | A * | 10/1995 | Ladewski ............... 356/601 |
| 5,465,153 | A * | 11/1995 | Ladewski ............... 356/601 |
| 5,465,390 | A | 11/1995 | Cohen |
| 5,467,441 | A | 11/1995 | Stone |
| 5,485,568 | A | 1/1996 | Venable |
| 5,491,644 | A | 2/1996 | Pickering |
| 5,517,575 | A * | 5/1996 | Ladewski ............... 382/108 |
| 5,528,518 | A | 6/1996 | Bradshaw |
| 5,555,354 | A | 9/1996 | Strasnick |
| 5,561,841 | A | 10/1996 | Markus |

(Continued)

OTHER PUBLICATIONS

T.S. Rappaport, et al., "Use of Topographic Maps With Building Informatin to Determine Antenna Placements and GP Satellite Coverage for Radio Detection and Tracking in Urban Environments", MPRG Technical Report MPRG-TR-95-14, Virginia Tech, Sep. 1995.

(Continued)

*Primary Examiner*—Joseph H Feild
*Assistant Examiner*—Huy D Nguyen (57) ABSTRACT A system and method for creating a site specific representation of an environment are disclosed. The system and method comprise sending an RF signal and receiving a reflected RF signal. Based upon determining characteristics of the reflected RF signal, characteristics of an obstruction in the environment are computed. Finally, a site specific representation of the environment based upon the computed characteristics is created.

22 Claims, 1 Drawing Sheet

U.S. PATENT DOCUMENTS

| | | | |
|---|---|---|---|
| 5,625,827 | A | 4/1997 | Krause |
| 5,689,355 | A | 11/1997 | Okubo |
| 5,710,758 | A | 1/1998 | Soliman |
| 5,755,072 | A | 5/1998 | Lingafelter |
| 5,761,093 | A | 6/1998 | Urbish |
| 5,794,128 | A | 8/1998 | Brocket |
| 5,828,960 | A | 10/1998 | Tang |
| 5,831,610 | A | 11/1998 | Tonelli |
| 5,845,124 | A | 12/1998 | Berman |
| 5,877,777 | A | 3/1999 | Colwell |
| 5,907,850 | A | 5/1999 | Krause |
| 5,926,762 | A | 7/1999 | Arpee |
| 5,940,196 | A | 8/1999 | Pichler |
| 5,945,976 | A | 8/1999 | Iwamura |
| 5,949,988 | A | 9/1999 | Feisullin |
| 5,953,669 | A | 9/1999 | Stratis |
| 5,963,867 | A | 10/1999 | Reynolds |
| 5,977,851 | A | 11/1999 | Stancil |
| 5,987,328 | A | 11/1999 | Ephremides |
| 5,994,984 | A | 11/1999 | Stancil |
| 6,032,105 | A | 2/2000 | Lee |
| 6,038,547 | A | 3/2000 | Casto |
| 6,044,273 | A | 3/2000 | Tekinay |
| 6,058,262 | A | 5/2000 | Kawas |
| 6,075,541 | A | 6/2000 | Maclinovsky |
| 6,088,522 | A | 7/2000 | Lee |
| 6,111,857 | A | 8/2000 | Soliman |
| 6,229,540 | B1 | 5/2001 | Tonelli |
| 6,285,377 | B1 | 9/2001 | Greenbaum |
| 6,330,005 | B1 | 12/2001 | Tonelli |
| 6,337,688 | B1 | 1/2002 | Berstis |
| 6,338,031 | B1 | 1/2002 | Lee |
| 6,356,758 | B1 | 3/2002 | Almeida |
| 6,470,195 | B1 | 10/2002 | Meyer |
| 6,487,414 | B1 | 11/2002 | Tanay |
| 6,487,417 | B1 | 11/2002 | Rossoni |
| 6,496,290 | B1 | 12/2002 | Lee |
| 6,681,140 | B1 | 1/2004 | Heil |
| 6,683,562 | B2 | 1/2004 | Stayton et al. |
| 7,235,766 | B2 * | 6/2007 | Shur et al. ................. 250/205 |
| 2001/0051503 | A1 | 12/2001 | Lush |
| 2002/0023244 | A1 | 2/2002 | Hatanaka et al. |
| 2002/0075825 | A1 | 6/2002 | Hills et al. |
| 2002/0177982 | A1 | 11/2002 | Boulouednine et al. |
| 2003/0023411 | A1 | 1/2003 | Witmer et al. |
| 2004/0038683 | A1 * | 2/2004 | Rappaport et al. .......... 455/446 |
| 2004/0211888 | A1 * | 10/2004 | Shur et al. ................. 250/221 |
| 2005/0253751 | A1 * | 11/2005 | Feisst et al. ................ 342/124 |

OTHER PUBLICATIONS

R.K. Morro, Jr. and T.S. Rappaport, "Getting In", Wireless Review Magazine, Mar. 2000.

R. Skidmore, et al., Russell Senate Office Building Propagation Study, Project Report for Joseph R. Loring & Associates: "Assessment and Study of the Proposed Enhancements of the Wireless Communications Environment of the Russell Senate Office Building (RSOB) and Associated Utility Tunnels", AOC Conract #ACBR96088, Prepared for Office of the Architect of the Capital, Feb. 20, 1997.

Wireless Valley Communications, Inc., "Siteplanner 3-16 for Windows 95/98/NT User's Manual", pp. 5-178 to 5-156, 1999.

M. Panjawani, et al., "Interactive Computation of Coverage Regions for Wireless Communication in Multifloored Indoor Environments", IEEE Journal on Selected Areas in Communications, vol. 4, No. 3, Apr. 1996.

T.S. Rappaport, et al., "Wireless Communications: Past Events and a Future Perspective", IEEE Communications Magazine, May 2002.

T.S. Rappaport, et al., "Radio Propagation Prediction Techniques and Computer-Aided Channeling Modeling for Embedded Wireless Microsystems, "ARPA Annual Report, MPRG Technical Report MPRG-TR-94-12, Virginia Tech, Jul. 1994.

T.S. Rappaport, et al, "Use of Topographic Maps With Building Information to Determine Antenna Placements for Radio Detection and Tracking in Urban Environments", MPRG Technical Report MPRG-TR-95-19, Virginia Tech, Nov. 1995.

D. Ullmo, et al. "Wireless Propagation in Buildings: A Statistical Scattering Approach", IEEE Transactions on Technology, vol. 48, No. 3, May 1999.

T.S. Rappaport, "Wireless Communications: Principles and Practice" Second Edition, Prentice Hall, 2002.

T.S. Rappaport, "Isolating Interference", Wireless Review Magazine, May 2000.

T.S. Rappaport and R. Skidmore, Slides From "Introduction to In-Building Wireless Systems", Infocast In-Building Wireless Solutions Conference and Exposition, Feb. 4, 2003.

S. Sandhu, M.P. Koushik and T.S. Rappaport, "Predicted Path Loss for Roslyn, VA", First Set of Predictions for ORD Project on Site Specific Propagation Prediction, MPRG Technical Report MPRG-TR-94-20, Virginia Tech, Dec. 1994.

S. Sandhu, M.P. Koushik and T.S. Rappaport, "Predicted Path Loss for Roslyn, VA", First Set of Predictions for ORD Project on Site Specific Propagation Prediction, MPRG Technical Report MPRG-TR-95-03, Virginia Tech, Mar. 1995.

S. Seidel, et al. "Site-Specific Propagation Prediction for Wireless In-Building Personal Communication Design", IEEE Transaction on Vehicular Technology, vol. 43, No. 4, Nov. 1994.

S. Shakkottal and T.S. Rappaport, "Research Challenges in Wireless Networks: A Technical Overview", Proceeding of Fifth International Symposium on Wireless Personal Multimedia Communications, Honolulu, HI, Oct. 2002.

H. Sherali, et al., "On the Optimal Location of Transmitters for Micro-Cellular Radio Communication System Design", IEEE Journal on Selected Areas in Communications, vol. 14, No. 3, pp. 662-673, May 1996.

R. Sidmore, et al., "A Comprehensive In-Building and Microcellular Wireless Communication System Design Tool", The Bradley Department of Electrical Engineering, MPRG-TR-97-13, Jun. 1997, Master's Thesis—Unpublished by Virginia Tech for 2 Years After Submission.

R. Skidmore, et al., Russell Senate Office Building Propagation Study, Project Report for Joseph R. Loring & Associates: "Project Update", ANC Contract #ACBR96088, Prepared for Office of the Architect of the Capital, Jan. 19, 1997.

R. Torres, et al. "Cindoor: An Engineering Tool for Planning and Design of Wireless Systems in Enclosed Spaces", IEEE Antennas and Propagation Magazine, vol. 41, No. 4, Aug. 1999.

R. Skidmore, et al., Interactive Coverage Region and System Design Simulation for Wireless Communication Systems in Multi-Floored Indoor Environments: SMT Plus im, IEEE ICUPC Proceedings, 1996.

Skidmore, et al., "Towards Integrated PSEs for Wireless Commmunicatiions: Experiences With the S4W and Siteplanner Projects", Mobile Computing and Communications Review, vol. 1, No. 2.

T.S. Rappaport, et al., "Radio Propagation Prediction Techniques and Computer-Aided Channel Modeling for Embedded Wireless Microsystems", MPRG Tech. Report MPRG-TR-95-08, Virginia Tech, Jul. 1995.

J. He, T.S. Rappaport, et al., Global Optimization of Transmitter Placement in Wireless Communications Systems, Technical Report, WNCG-TR-2003-10-7, Oct. 2003.

Jeremy K. Chen and T.S. Rappaport, "Cool Cloud Wireless LAN Design Guidelines and User Traffic Modeling for In-Store Use (Part 1: System Deployment)" Technical Report, Project Sponsor: Schlotzsky's, Inc. UTA 3-390, WNCG-TR-2003, 11-01, Nov. 2003.

Chen Na and T.S. Rappaport, "Cool Cloud Wireless LAN Design Guidelines and User Traffic Modeling for In-Store Use (Part 2: Traffic Statistics)" Technical Report, Project Sponsor: Schlotzsky's, Inc. UTA 3-390, WNCG-TR-2003, 11-01, Nov. 2003.

Company Web Page "Agilent" www.agilent.com, Product Name: Wizard.

Company Web Page "COMARCO" www.edx.com, Product Name: SignalPro.

Company Web Page "COMOPT" www.comopt.com, Product Name: CellOpt.
Company Web Page "Lucent" www.bell-labs.com, Product Name: WiSE.
Company Web Page "Ericsson" www.ericsson.com, Product Name: TEMS Lite.
Company Web Page "Ericsson" www.ericsson.com, Product Name: TEMS.
Company Web Page "Marconi" www.marconi.com, Product Name: PlaNET.
Company Web Page "Marconi" www.marconi.com, Product Name: decibelPlanner.
J. He, A. Vertak, L.T. Watson, C.A. Stinson, N. Ramakrishnan, C.A. Shaffer, T.S. Rappaport, C.R. Anderson, K. Bae, J. Jiang, and W.H. Tranter, Article Submited to IEEE Transactions on Wireless Communications, Aug. 2002 Titled, "Globally Optimal Transmitter Placement for Indoor Wireless Communication System".
Software by Andrew, Titled "RF Planner" Dated Jun. 17, 1997.
A User Guide Titled "Andrew Microwave System Planner" Dated Jul. 1999.
A User Guide Titled "Andrew Antenna System Planner" Dated Jun. 1999.
Article "Building Database Manipulator", Copyright, Jan. 1998, MPRG and Virginia Tech.
T. Rappaport, PCS 97 Track 7; Engineering & Systems Management. Propagator; vol. 8, No. 3; Fall.
R. Skidmore & T. Rappaport; SMT Plus 1.0 User's Manual; Copyright, Aug. 1996, Virginia Tech.
Intel Technology Journal, vol. 7, Issue 3, Aug. 2003.
IT Wireless Web Article, Nov. 2003.
P. Tournois, et al. "Pick Your Wireless Solution", Web Article, McCombs School of Business, University of Texas at Austin.
Article From Visionael Website.
Article From the Chantry Networks Information Website.
Article From the Aruba Networks Information Website.
Article From the Meru Networks Information Website.
Article From the Legra Networks Information Website.
Article From the Trapez Networks Information Website.
Brian Jenkins, "Airflow Technology—Solving the WLAN Dilemma", Airflow Networks Information Website, Jul. 2003.
Dr. Harry Bims, "Securing Enterprise WLANS", Aug. 2003.
Dr. Harry Bims, "Enabling Voice-Over WLANS", Sep. 2003.
Brian Jenkins, "High Availability for Mission-Critical WLANS", Sep. 2003, Airflow Applications Guide.
Articles From the Airespace Networks Information Website.
T.S. Rappaport, M. Koushik, M. Ahmed, C. Carter, B. Newhall, and N. Zhang, "Use of Topographic Maps With Building Information to Determine Antenna Placements and GPS Satellite Coverage for Radio Detection and Tracking in Urban Environments", MPRG Technical Report MPRG-TR-95-14, Virginia Tech, Sep. 1995.
T.S. Rappaport, et al. "Wireless Communications: Past Events and a Future Perspective", IEEE Communications Magazine, Jun. 2002.
S. Shakkottai, T.S. Rappaport, "Research Challenges in Wireless Networks: A Technical Overview", 5th International Symposium on Wireless Personal Multimedia Communications, Honolulu, HI, Oct. 2002.
R.K. Morrow, T.S. Rappaport, "Getting In", Wireless Review Magaine, Mar. 2000.
Rajkumar, "Predicting RF Coverage in Large Environments Using Ray-Beam Tracing and Partitioning Tree Represented Geometry", Wireless Networks, vol. 2, 1996.
R.K. Morrow, Jr., "Site-Specific Indoor Planning", Applied Microwave and Wireless Magazine, Mar. 1999.
PCT/US06/14397—International Search Report mailed Aug. 23, 2007—9 pages.
PCT/US06/14397—International Preliminary Report on Patentability mailed Nov. 1, 2007—7 pages.

* cited by examiner

METHOD AND APPARATUS FOR UTILIZING RF SIGNALS TO CREATE A SITE SPECIFIC REPRESENTATION OF AN ENVIRONMENT

CROSS REFERENCE TO RELATED APPLICATIONS

This application claims the benefit of U.S. provisional application No. 60/672,075 filed Apr. 18, 2005, which is incorporated by reference as if fully set forth.

FIELD OF THE INVENTION

The present invention relates generally to wireless communications systems and more specifically to utilizing radio frequency (RF) signals to create a site specific representation of an environment.

BACKGROUND

As wireless communications use increases, radio frequency (RF) coverage within buildings and signal penetration into buildings from outside transmitting sources has quickly become an important design issue for wireless engineers who must design and deploy cellular telephone systems, paging systems, or new wireless systems and technologies such as personal communication networks or wireless local area networks. Designers are frequently requested to determine if a radio transceiver location or a base station cell site can provide reliable service throughout a city, an office, a building, an arena or a campus. A common problem for wireless systems is inadequate coverage, or a "dead zone," in a specific location, such as a conference room.

There are many computer aided design (CAD) products on the market that can be used to design the environment for a wireless system. WiSE from Lucent Technology, Inc., SignalPro from EDX, PLAnet by Mobile Systems International, Inc., and TEMS and TEMS Light from Ericsson are examples of wireless CAD products. In practice, however, a pre-existing building or campus is designed on paper (e.g. blueprints) and may be input in to a CAD product to create CAD drawings of the environment. Once the design is input into a CAD product, the CAD product represents the environment in electronic form, which allows the designer to then manipulate the electronic form to plan for efficient design. However, many times the paper blueprints and/or the CAD drawings are not available and/or do not exist.

If the paper blueprints and/or CAD drawings do not exist or are difficult to obtain, then there is no way for the designer to utilize design tools that optimize the wireless system for the environment. Without being able to utilize design tools, a network designer is not able to build a wireless system easily, efficiently, and inexpensively.

Accordingly there exists a new method and apparatus for utilizing RF signals to create a site specific representation of an environment.

BRIEF DESCRIPTION OF THE DRAWINGS

The above needs are at least partially met through provision of the method and apparatus for utilizing RF signals to create a site specific representation of an environment described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, a wireless element (such as, but not limited to, a wireless transceiver) utilizing RF signals can create a site specific representation of an environment. By one approach, this comprises sending and receiving RF signals to determine whether an obstruction exists in the physical environment. Based upon the determination, a site specific representation of the physical environment is created.

Figure 1:
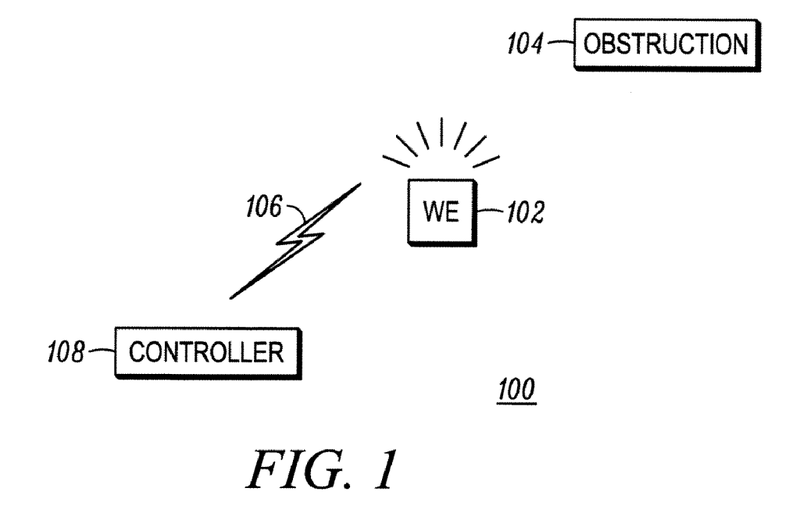
FIG. 1 shows an example system in accordance with on embodiment of the present invention.

These and other benefits may become clearer upon making a thorough review and study of the following detailed description. Referring now to the drawings, and in particular to FIG. 1, a corresponding system 100 provides for a wireless element (such as, but not limited to, a transceiver as is known in the art) sending RF signals and receiving reflected RF signals in a physical environment to compute characteristics of an obstruction in the physical environment. Upon computing the characteristics of an obstruction in the physical environment, the wireless element creates a site specific representation of the physical environment. As used herein, site specific means that electromagnetic attributes are integrated with an electronic representation of the obstructions in the physical environment.

FIG. 1 shows one wireless element 102 for sake of ease of description. However, as is known to one of ordinary skill in the art, the system 100 may comprise any number of wireless elements and the illustration and description of one wireless element 102 is not meant to be a limitation on any embodiment of the present invention.

In addition to a wireless transceiver, examples of the wireless element 102 include a wireless local area network (LAN) access point, a client/mobile device, and a cell phone. In any case, the wireless element 102 may be any fixed, mobile, or portable transmitting and receiving device.

As is known to one of ordinary skill in the art, sending RF signals and receiving reflected RF signals is known as "RF sounding" and may be conducted by one or more transmitters sending a series of RF transmissions, and by a receiver receiving the RF transmissions sent by the transmitter. As used herein, sending RF signals and receiving reflected RF signals to determine characteristics of the received reflected RF signal is termed "sounding measurements" and the two phrases are used interchangeably in this description.

The RF signals used to perform sounding measurements may be simple carrier waves, or may contain modulated signals, and they may be burst-like, or continuous (overlayed) over other modulation or multi-carrier signals. That is, the RF signals may have a dual purpose, such as carrying information required by an end user or for signaling in the wireless network, while at the same time providing a "sounding" capability in order to determine information about the physical environment, e.g. about the relative or actual distance of obstructions in the environment. Alternatively, the RF signal may be a "stand alone" signal, or may be used simultaneously with a dotting sequence or other type of preamble, postamble, or synchronization radio transmission.

As used herein, the term obstruction refers to any structure in the physical environment that affects the RF signal, such as a walls, furniture, vehicles, buildings, windows, tree, etc. For example, a concrete wall is an obstruction that affects RF signals in the physical environment.

Referring back to FIG. 1, in any case, the wireless element 102 may be a transceiver having both transmitter and receiver functionality. As such, the wireless element 102 performs the sending of RF signals and the receiving of reflected RF signals. In one non-limiting example, the wireless element 102 is an ultra wideband (UWB) transceiver. In any case, in one embodiment, the wireless element 102 is a wideband transceiver with the ability to determine an obstruction in the physical environment with an accuracy of better than 10 feet.

In one embodiment, the wireless element 102 may comprise a transmitter and receiver, both of which are co-located. In such an embodiment, the transmitter may comprise a directional antenna that rotates. Alternately, the transmitter may have a smart or adaptable antenna capable of adjusting the antenna pattern in order to focus the antenna radiation pattern in particular directions and changing the direction as needed in order to direct transmitted signals in a particular manner. Further, in such an embodiment, the receiver may share the same antenna as the transmitter or may have a similar antenna with the ability to focus its reception in a particular direction. Alternately, the antenna of the receiver may be omnidirectional, but capable of discerning angle of arrival information for received signals. In one embodiment, the antennas of the transmitter and receiver may be synchronized to focus on the same area simultaneously. As is known to one of ordinary skill in the art, by focusing the antenna of the transmitter in a particular direction, the transmitter transmits a RF signal. If the RF signal intersects an obstruction along the straight path from the transmitter, it will reflect off of the obstruction. One reflection will be back in the direction of the transmitter. The receiver then listens for the RF signal to return along the same path that it was transmitted and detect the reflected RF signal.

In another embodiment, the wireless element 102 may be distributed among a number of transmitters located at a number of different locations within the physical environment. In such a case, the wireless element sends RF signals from a number of different transmitters. In such an embodiment, the receivers may also be distributed at different locations from the transmitters or may be co-located with the transmitters. In any case, the transmitters and receivers may be networked together, and controlled by a controller 108. In such an embodiment, the controller 108 may be termed a switch, a server, a remote computer, or an onsite computer. As such, the controller 108 may be connected via remote fashion to the wireless element 102, such as via the internet, telephone, satellite, cellular, or optical or wired methods to exploit the sounding measurements to create a site specific representation of the physical environment.

In another embodiment, the wireless element 102 may comprises a number of transceivers distributed within the physical environment. In such a case, the wireless element 102 sends RF signals from a number of different transceiver (e.g. wideband transceivers). As such, the transceivers may be networked together, and controlled by a controller 108. In such an embodiment, the controller 108 may be termed a switch, a server, a remote computer, or an onsite computer. As mentioned above, the controller 108 may be connected via remote fashion to the wireless element 102, such as via the internet, telephone, satellite, cellular, or optical or wired methods to exploit the sounding measurements to create a site specific representation of the physical environment.

In another embodiment, each wireless element 102 in the system 100 has its own controller 108 so that a network switch (not shown) controls the operation of the controllers. In such an embodiment, the controllers may be co-located with the wireless elements 102 or located remotely from the wireless elements and connected either wirelessly or wired. The controller may handle some or all of the processing of the information collected from the sounding measurements performed by the wireless elements. Note that the Controller also could be collocated at the Network Switch. In such an embodiment, the network switch processes the sounding measurements for computing characteristics of obstructions. Further, the network switch may create an electronic representation of the physical environment based upon the computations.

In one embodiment, the wireless element 102 may have adjustable or adaptable characteristics that may be tweaked or adjusted, either manually or under computer control or under network control, to improve or differentiate the sounding measurements. Such adjustable or adaptable characteristics are often used and adjusted in conventional communications, e.g. to conserve power, to exploit the radio channel for improved communication performance, etc. As is known to one of ordinary skill in the art, transmitters often have the ability to adjust transmitter power, or to change frequency of transmission (e.g. change transmit channel), or to alter the waveform or modulation of its transmitted signal, or to adjust the occupied RF bandwidth of its transmitted signal, or to select one or more antennas or antenna patterns, or to form different antenna beams for its transmission (IEEE 802.11n or MiMo techniques or antenna steering devices used in WLAN provided by Xirrus and Bandspeed are some examples). Similarly known to one of ordinary skill in the art, receivers generally have the ability to adjust characteristics such as its thermal noise floor (through the use of attenuation and amplification in its circuitry), sampling time interval in digital processing circuits, receiver modulation, receiver bandwidth, receiver carrier frequency, or the ability to select one or more antennas or antenna patterns, or to form different antenna beams for its transmission (IEEE 802.11n or MiMo techniques, or antenna steering devices used in WLAN provided by Xirrus and Bandspeed are some examples). Further known, receivers and transmitters generally have accurate clocks and accurate leveling circuits that provide stable timing signals and stable transmitted and received signal levels, and through the use of such stable timing and amplitude/frequency characteristics, computation of characteristics of obstructions in the physical environment is possible. Further, feedback may be employed to improve the sounding measurements.

The wireless element described herein may be used with mesh radio networks, or rapidly deployable transmitters and receivers, as well as with previously installed networks.

In any case, the wireless element 102 may send and receive RF signals periodically, at random, upon human direction or automatically. Further, in one embodiment, the controller 108 may direct the frequency of the sending and/or receiving of RF signals. In any case, the wireless element 102 may direct the sending and/or receiving of RF signals. For example, at high frequencies, such as above 5 GHz, the antennas on the wireless element may become small enough to be able to control. In such an embodiment, the wireless element 102 may perform sector-by-sector sounding measurements so that the sector-by-sector computations of obstructions may be performed. In such an embodiment, the accuracy and estimation of the sounding measurements may be improved.

For example, by rotating the antenna of the wireless element 102 in small radial increments while transmitting and detecting reflected signals, the size, shape, position, and other geometrical information from the surrounding obstructions can be discerned. In such a fashion, if a wall is in close proximity to the wireless element 102, the transmitted signals in the direction of the wall will produce a reflection that the receiver of the wireless element will detect and correctly interpret to gauge the distance of the obstruction, e.g. the wall. As the transmitter of the wireless element 102 rotates, subsequent transmissions and received reflections will follow the length of the wall. When the edge of the wall is reached, the next rotation of the transmitter will produce a different reflection, e.g. either off of the adjoining wall or some obstruction farther out. This allows the invention to discern the relative size and shape of the obstruction, e.g., that the wall is a flat, continuous surface.

In one embodiment, once direct path obstructions are identified, additional sounding measurements may be performed to discern further information about the environment. For example, once the relative geometry of the surrounding environment has been discerned, further sounding measurements may be performed to resolve further details of the environment using not only a single direct path reflection but also multiple reflections.

Returning to FIG. 1, in one embodiment, the controller 108 may collect the sounding measurements from the wireless element 102 to perform calculations of an obstruction in the physical environment. In another embodiment, the controller 108 may receive the output of the calculations so that the calculations are performed at the wireless element 102. Further, the controller 108 may probe the wireless element 102 for sounding measurements and/or output of the calculations, or the wireless element 102 may provide it automatically or periodically to the controller (e.g. in an interrupt driven manner).

In one embodiment, the sounding measurements may be part of a wireless communications protocol, such as IEEE 802.15.3.a where the sounding measurements are added to required messaging of the wireless communications protocol. For example, beacon messages may be followed by sounding measurements. In any case, the mention of a specific communications protocol is not meant to be a limitation on Applicants' claimed invention. In another embodiment, the sounding measurements may be added as a user application or an application specific implementation using standard chipsets.

In one embodiment, upon performing the sounding measurements (namely sending RF signals and receiving reflected RF signals), characteristics of an obstruction are computed based upon characteristics of the received reflected RF signal. In one embodiment, computing characteristics of an obstruction based upon characteristics of the received reflected RF signal may be performed by well known processing, averaging, or dithering techniques such as described in Rappaport's textbook Wireless Communications, c. 2001.

In one embodiment, characteristics of an obstruction comprise at least a location of the obstruction.

For example, after sending an RF signal and receiving the reflected RF signal (also known as echo or backscatter), a round trip distance may be computed, e.g. by taking the time of travel of the RF signal and multiplying the speed of light. Thus, the location of an obstruction can be computed as having a distance equal to the round trip distance from the wireless element. Similarly, a location and electromagnetic properties of an obstruction can be computed by taking the transmit power and antenna pattern to determine the total path loss of the transmitted RF signal, such as described in Rappaport's textbook Wireless Communications, c. 2001, and then substituting the known parameters into a path loss calculation (as shown below) to solve for the electromagnetic properties of the obstruction. Using similar and well known techniques, it is possible to further determine the path loss, time delay, reflection coefficient, attenuation, thickness, or received signal strength to determine the location of an obstruction. As is known in the art, such techniques are widely described with reference to radar technology.

In any case, the sounding measurements are used to create a site specific representation of the environment and may be useful where the environment does not have CAD drawings or other such electronic representations of the physical environment. In one embodiment, the site specific representation comprises information relating to properties of the environment, e.g. wireless propagation parameters, such as path loss, reflectivity, attenuation, size, or width.

The resulting sounding measurements enable a computer or controller to build up a site-specific representation of the physical environment, so that radio resource management and power/frequency/handoff/provisioning decisions may be made more intelligently by a wireless network to ensure improved performance. Such site-specific knowledge is critical for deploying improved mission-critical wireless network performance, as has been shown b y previous work and patents by Rappaport, Skidmore, et al. This invention provides a non-obvious and vastly improved mechanism for gathering and implementing site-specific models, without the requirement of reading in blue prints or having a CAD drawing of the environment available at the network server. Furthermore, the present invention allows for the installed network to make sounding measurements so as to update the computerized physical environmental "radio map" of the site, thus making it more useable for environments such as large factories where large obstructions are moved throughout the site, thus creating different site-specific environments which would not be properly represented with a static CAD drawing.

Using a site specific representation of the environment allows a network designer to design the wireless network so that wireless elements in the wireless network are able to use power more efficiently, provide needed quality of service, and to adapt to interference from increasing numbers of users and spectrum pollution. The ability to properly configure or control a wireless network improves markedly when a site specific representation of the environment is available, as it provides knowledge of the channel in a much better way than random guessing.

In one embodiment, the site specific representation may be used to improve the configuration or operation of a wireless network. As such, the site specific representation may be used to augment an existing computerized model of the environment. For example, the site specific representation may be augmented by planning software, such as Enterprise Planner, LAN Planner, or Site Planner manufactured by Motorola, Inc.

In one embodiment, a method for utilizing RF signals to create a site specific representation of an environment is disclosed. As such, an example method is described with reference to FIGS. 2 and 3. First, a RF signal is sent (step 202). As mentioned above, the RF signal may be a simple carrier wave, or may comprise a modulated signal, and may be burst-like, or continuous (overlayed) over another modulated or multi-carrier signal. That is, the RF signal may have a dual purpose, such as carrying information required by an end user or for signaling in the wireless network, while at the same time providing a "sounding" function, e.g. to determine information about the physical environment, such as the relative or actual distance of obstructions in the environment. Alternatively, the RF signal may be a "stand alone" signal, or may be used simultaneously with a dotting sequence or other type of preamble, post-amble, or synchronization radio transmission.

Figure 2:
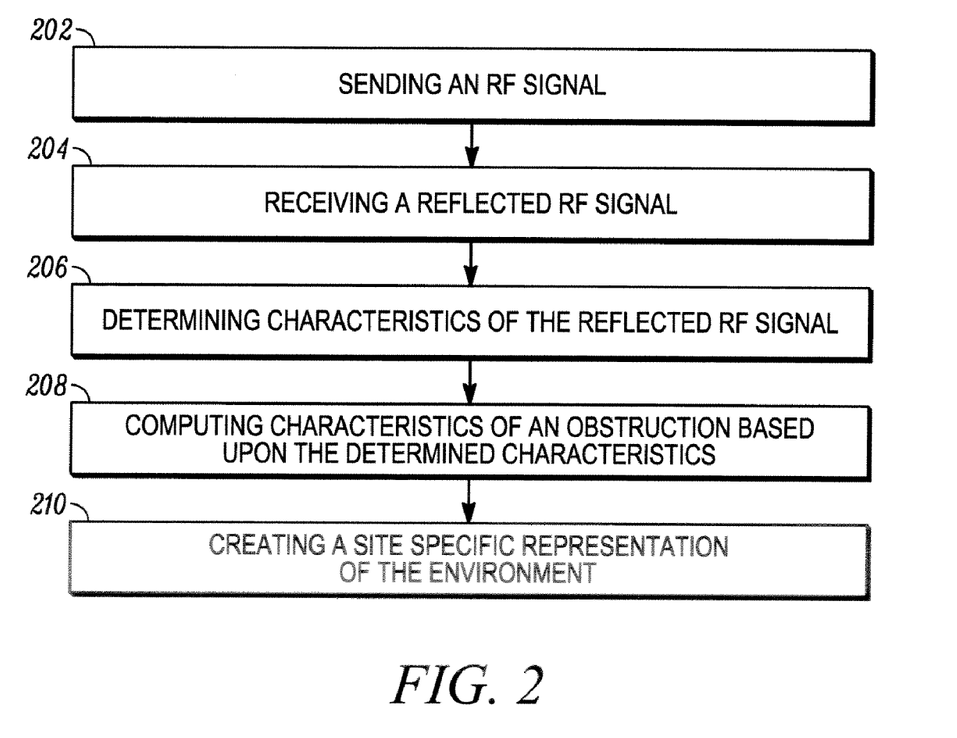
FIG. 2 shows an example method in accordance with a second embodiment of the present invention.

Continuing, a reflected RF signal is received (step 204) and characteristics of the reflected RF signal are determined (step 206). In one embodiment, determining the characteristics of the reflected RF signal (step 206) means to calculate an RF propagation time (e.g. the time difference between the sent RF signal and the received reflected RF signal) and signal level attenuation (path loss). In another embodiment, determining the characteristics of the reflected RF signal means to observe a signal strength of the received reflected RF signal, a spectrum of the received reflected RF signal, and the particular antenna beam pattern used. As is known to one of ordinary skill in the art, in any case, determining characteristics of the reflected RF signal comprises at least one of time, amplitude, frequency, and spatial properties of the sent RF signal and/or the received reflected RF signal. It should be clear that other characteristics, such as the received reflected RF spectrum, RF spectral characteristics, frequency selective characteristics, relative amplitudes of tones in an OFDM or multicarrier signal, and other signal parameters known now or in the future could also be determined.

From the determined characteristics of the reflected RF signal, characteristics of an obstruction based upon the determined characteristics of the reflected RF signal are computed (step 208). Continuing, the wireless element 102 creates a site specific representation of the environment from the computed characteristics of the obstruction (step 210).

Following is one non-limiting example of the steps of FIG. 2, a wireless element with a directional beam antenna having a beam width of 5 degrees sends out RF signals (step 202), periodically, at different locations in space. For example, the wireless element may send a 20 millisecond RF signal every 50 milliseconds by sequentially adjusting an antenna beam of the wireless element by 5 degrees clockwise every 50 milliseconds. Immediately after the RF signal is transmitted, the wireless element receives reflected RF signals (step 204) to determine characteristics of the reflected RF signal (step 206). If the wireless element utilizes spread spectrum direct sequence modulation with a chip rate of 500 Megachips per second (e.g. 2 nanosecond chip duration) for transmitting RF signals, then the receiver may use a matched filter or a sliding correlator (as described in e.g. Rappaport's textbook Wireless Communications, c. 2001) to perform time synchronization so that the wireless element may determine the RF propagation time between the transmitted RF signal and the received reflected RF signal (step 206). As is known to one of ordinary skill in the art, determining characteristics of the reflected RF signal (step 206) does not require time synchronization as relative delay times may be used to determine the RF propagation time.

In any case, characteristics, including the location, of an obstruction may be computed (step 208) by taking the RF propagation time and multiplying it by the speed at which the RF signal travels, e.g. $3*10^8$ meters per second.

In another example, the location of an obstruction that was computed (step 208) may be modified by calculating the attenuation (path loss) of the received reflected RF signal. As is known to one of ordinary skill in the art, the attenuation (path loss) of the radiated signal may be determined through knowledge of the distance, carrier frequency, transmitted power, and antenna patterns (gain) used at both the transmitter and receiver. Using Friis free space equation, the transmitted power Pt and the carrier frequency f and the antenna gains of the transmitter and receiver, Gt and Gr, respectively, and the distance of the radio wave d may be related to the received power by:

$$Pr=[Pt*Gt*Gr*(c/f)^2]/(4*\pi*d^2)$$

Thus, depending on the transmitted power Pt, the carrier frequency, and the antenna gains and distance traveled, the measured signal strength at the receiver (Pr) can be compared against the free space signal that would be expected if there were no obstructions. Any received signal weaker than free space would obviously be due to additional path loss that can be attributed to an obstruction in the physical environment. A stronger than free-space signal would be attributed to the impact of multipath, and the presence of a very strong reflector that serves to amplify the antenna gains of the transmitter or receiver. Thus, the computed location of the obstruction may be modified by the calculated received power Pr. For example, a received power Pr that is stronger than free space would require that the computed location of the obstruction be adjusted to account for the presence of a very strong reflector in the environment.

As mentioned above, if the wireless element 102 comprises both transmitter and receiver functionality, then the round trip time from the wireless element to the obstruction and back to the wireless element, will be twice the propagation time to the obstruction. Note that in such a case, the received signal strength will indicate the loss through the channel due to the two-way transmission time to an obstruction, as well as the attenuation (reflectivity) of the obstruction, itself. In one embodiment, a table look up or some other computerized mechanism may be used to correlate the measured path loss with the measured distance to extrapolate the RF attenuation of the obstruction. In one embodiment, extrapolating the RF attenuation of the obstruction allows for estimating the type of the obstruction.

Once characteristics, e.g. the location, of the obstruction has been computed (step 208), then the process is repeated by periodically transmitting an RF signal using a different antenna pointing direction, e.g. varied by 5 degrees every 50 ms. Once a 360 degree composite is performed, then a complete site specific representation of the physical environment may be created. For example, an adaptive antenna may be used and a sector-by-sector representation of time of arrival may be constructed from the transmitted signal. By fusing or processing the various times of arrival taken over different angular segments using a directional antenna and receiving the reflected RF signals, locations of obstructions in the physical environment may be determined. Finally, the wireless element creates a site specific representation of the physical environment from the computed characteristics, e.g. the computed location (step 210). Even though an embodiment of the present invention has been described with reference to a 360 degree antenna sweep, the invention is not so limited, as any combination of horizontal and vertical antenna positioning or beam forming may be used to compute locations of obstructions in the environment.

In one embodiment, the characteristics of the reflected RF signals in terms of signal strength, angle of arrival, phase, time of arrival, scattering, and other measurable RF signal characteristics can be utilized to discern characteristics of the obstructions producing the reflections. For example, if the obstruction is highly dense and reflective (e.g., a solid metallic surface), then the received signal strength of the received reflected RF signal will be quite high, whereas if the obstruction is very porous (e.g., a sheetrock wall), then the received signal strength of the received reflected RF signal will be quite low. In any case, analyzing reflected signals (also known as scattered signals), the characteristics of the obstructions may be determined. In any case, the determined characteristics of the obstructions are then incorporated into the site specific representation of the environment and may be used for later RF performance or quality of service assessment of wireless network in the environment.

Continuing with FIG. 2, in one embodiment, creating a site specific representation of the environment (step 210) is defined as translating the characteristics of the obstruction into a computerized model of the surrounding environment. In one embodiment, each obstruction is converted into a polygonal planar surface whose edges correspond to the obstruction in the environment. A virtual Cartesian coordinate system is applied, with the wireless element existing at the {0,0,0} axes' center. Note that one skilled in the art can see how other coordinate systems could be easily applied, such as spherical, rectangular, latitude longitude, or any other form of coordinate system known now or in the future. Taking the computed location of the obstruction, the polygonal planar surfaces corresponding to the obstruction may be placed on the virtual Cartesian coordinate system. In one embodiment, placement may be performed by storing e.g. in vector format, a collection of coordinates corresponding to the vertices of each polygonal planar surface.

Once the obstructions are specified in the virtual Cartesian coordinate system, characteristics of the obstruction, e.g., attenuation, reflectivity, surface roughness, absorption, or other RF properties of the obstruction may associated with each obstruction. In one embodiment of the invention, these characteristics are stored in a computerized table format where each table entry is given an index; each obstruction may be tagged with the index and the index may be used to lookup its associated characteristics in the table as needed Further, locations of the wireless elements in the environment may be placed in the site specific representation. For example, if the wireless element has a built-in global positioning device that enables it to detect its current latitude, longitude, and elevation, or if the wireless element is given a coordinate at which it is positioned different than the {0,0,0} assumed position, then in one embodiment, the coordinates of the vertices of the obstructions will be adjusted accordingly.

In any case, once the site specific representation is created, the site specific representation may be stored in computer readable form, and may exist in RAM, DRAM, electric or magnetic media, or any other type of active or passive memory known now or in the future. As such, the site specific representation may be shared or transported by wired or wireless means with other devices, controllers or computers and the site specific representation may be refined, expanded, abstracted to suit a particular application. Furthermore, for humans to use and process the information of the physical environment, a computer program or programs may process the site specific representation of the physical environment to create a human viewable file of the environment. In one embodiment, the human viewable files are electronic files that may be processed, represented and rendered in a computer, and include Computer Aided Design files, such as Autodesk .DXF or other types of commonly used and standardized file formats, or bitmap or raster or vector images of the physical environment. In one embodiment, the method described herein allows for the formation of Building Database files, as that term is known in the art.

In one embodiment of the present invention, a format for representing, storing and transporting the site-specific representation of the environment is as described with reference to U.S. Pat. No. 6,721,769 to Rappaport et. al.

Further yet, once the site specific representation is created, the site specific representation may be shared so that a wireless network existing in the physical environment may be optimized.

There are myriad examples of the utility of using the site specific representation of the physical environment. First, a wireless network that can "sense" its own physical environment will enable the wireless network to provide better performance, by knowing the location of obstructions. For example, wireless elements in the area of an obstruction may be controlled to change or select transmitter power, frequency, channel, antenna configuration, data rate, through put goal, protocol, or modulation technique because of the obstruction. Also, knowledge of obstructions is critical for proper spectrum management and interference migration as well as rogue detection and adaptive network performance. It is clear that the advantage of having knowledge of obstructions may be exploited to optimize or properly provision wireless devices and networks in the face of changing interference, user profiles, as well as changes in the physical environment.

Further, by creating a site specific representation, dependency on blueprints or maps of buildings or cities is lessened since maps may be created on-the-fly, and the resulting maps may be shared with other devices, in order to improve and make better use of RF resources. The site-specific representation may allow wireless elements to know where they are and what their environment is, before they transmit or receive any RF signals. Thus, wireless elements can save power and pre-set their transmission or receive parameters before draining the battery. Through the use of site-specific representations of the environment, these wireless elements will be able to know where they are and what their environment looks like, from an RF perspective.

Second, the ability to produce site specific representations may provide public safety value. Having a site specific representation of the location of obstructions that can be converted into a human viewable and usable file would be of great value to fire, rescue, and police who have to enter a building, campus, city, or mine, etc. that is on fire or under siege.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method for creating a site specific representation of a wireless communication environment, the method comprising:

sending an RF signal into the wireless communication environment that is to be represented;
receiving a reflected RF signal;
determining characteristics of the reflected RF signal;

computing characteristics of a plurality of encountered obstructions in the wireless communication environment based upon the determined characteristics of the reflected RF signal, wherein the plurality of encountered obstructions comprises any structures in the physical environment that affect the RF signal;

creating a site specific representation of the wireless communication environment based upon the computed characteristics, wherein the step of creating a site specific representation further comprises translating the characteristics of the plurality of encountered obstructions into a computerized model of the wireless communication environment by converting the encountered obstructions into a polygonal planer surface; and placing the polygonal planer surface on a virtual coordinate system representation of the wireless communication environment.

2. The method of claim 1 wherein the site specific representation comprises electromagnetic attributes integrated with the physical wireless communication environment.

3. The method of claim 2 wherein the site specific representation comprises electromagnetic attributes of the obstruction.

4. The method of claim 1 wherein the step of computing characteristics comprises computing a location of the obstruction in the wireless communication environment.

5. The method of claim 1 wherein the site specific representation is stored in computer aided design format.

6. The method of claim 1 further comprising the step of utilizing the created site specific representation to optimize the operations of a wireless communication environment.

7. The method of claim 1 wherein the characteristics of the reflected RF signals comprises at least one of path loss, time delay, signal strength, angle of arrival, phase, time of arrival, reflection coefficient, attenuation, and scattering.

8. The method of claim 1 further comprising creating the site specific representations of the wireless communication environment based upon the computed characteristics as obstructions are moved throughout the site.

9. The method of claim 1, wherein the plurality of encountered obstructions comprises a plurality of: walls, furniture, vehicles, buildings, windows, or trees.

10. A system for creating a site specific representation of a wireless communication environment, the system comprising:
    a wireless element comprising sending and receiving RF signal functionality;
    a controller that determines characteristics of a plurality of encountered obstructions in the wireless communication environment from receiving reflected RF signals that are received in response to sent RF signals, wherein the plurality of encountered obstructions comprises any structures in the physical environment that affect the RF signals; and
    a site specific representation created by the controller from the determined characteristics of the obstruction comprising electromagnetic attributes integrated with the physical wireless communication environment; wherein the controller is in communication with the wireless element, and wherein the site specific representation further comprises translations of the characteristics of the obstruction into a computerized model of the wireless communication environment in which the obstruction is converted into a polygonal planer surface, the polygonal planer surface being placed on a virtual coordinate system representation of the wireless communication environment.

11. The system of claim 10 wherein the wireless element comprises at least one of a) co-located transmitters and a receiver, b) a transceiver, and c) transmitters and a receiver at different locations.

12. The system of claim 10 wherein the reflected RF signals are at least one of a) simple carrier waves, b) modulated RF signals, and c) multi-carrier RF signals.

13. The system of claim 10 wherein the site specific representation comprises a computer readable format that exists in at least one of the following formats: RAM, DRAM, electric and magnetic media.

14. The system of claim 10 further comprising a network switch in control of the controller.

15. The system of claim 10 wherein the wireless element comprises timing functionality to periodically send RF signals to perform sounding measurements, wherein sounding measurements comprises sending RF signals and receiving reflected RF signals to determine characteristics of the received reflected RF signals.

16. The system of claim 10 wherein the wireless element comprises adjustable antennas for transmitting and receiving RF signals.

17. The system of claim 10 wherein the controller comprises a processor for computing characteristics of the determined obstruction.

18. The system of claim 10, wherein the plurality of encountered obstructions comprises a plurality of: walls, furniture, vehicles, buildings, windows, or trees.

19. A system for creating a site specific representation of a wireless communication environment, the system comprising:
    means for sending an RF signal into the wireless communication environment that is to be represented;
    means for receiving a reflected RF signal;
    means for determining characteristics of the reflected RF signal;
    means for computing characteristics of a plurality of encountered obstructions in the wireless communication environment based upon the determined characteristics of the reflected RF signal, wherein the plurality of encountered obstructions comprises any structures in the physical environment that affect the RF signal; and
    means for creating a site specific representation of the wireless communication environment based upon the computed characteristics wherein the means for creating a site specific representation further comprises translating the characteristics of the obstruction into a computerized model of the wireless communication environment by converting the obstruction into a polygonal planer surface; and placing the polygonal planer surface on a virtual coordinate system representation of the wireless communication environment.

20. The system of claim 19 wherein the means for sending and the means for receiving adhere to a wireless communications protocol.

21. The system of claim 19 wherein the site specific representation comprises computer aided drawings of the wireless communication environment.

22. The system of claim 19, wherein the plurality of encountered obstructions comprises a plurality of: walls, furniture, vehicles, buildings, windows, or trees.

* * * * *

UNITED STATES PATENT AND TRADEMARK OFFICE
CERTIFICATE OF CORRECTION

| | | |
|---|---|---|
| PATENT NO. | : 7,773,995 B2 | Page 1 of 1 |
| APPLICATION NO. | : 11/405167 | |
| DATED | : August 10, 2010 | |
| INVENTOR(S) | : Rappaport et al. | |

It is certified that error appears in the above-identified patent and that said Letters Patent is hereby corrected as shown below:

TITLE PAGE,

Item (56), under "OTHER PUBLICATIONS", in Column 2, Line 2,
delete "Informatin" and insert -- Information --, therefor.

Title Page 2, in Item (56), under "OTHER PUBLICATIONS", in Column 1, Line 7, delete "Conract" and insert -- Contract --, therefor.

Title Page 2, in Item (56), under "OTHER PUBLICATIONS", in Column 2, Line 36, delete "Sidmore," and insert -- Skidmore, --, therefor.

Title Page 2, in Item (56), under "OTHER PUBLICATIONS", in Column 2, Lines 52-53, delete "Communicatiions:" and insert -- Communications: --, therefor.

Title Page 3, in Item (56), under "OTHER PUBLICATIONS", in Column 1, Line 15, delete "Submited" and insert -- Submitted --, therefor.

Title Page 3, in Item (56), under "OTHER PUBLICATIONS", in Column 2, Line 24, delete "Magaine," and insert -- Magazine, --, therefor.

IN THE SPECIFICATION

In Column 9, Line 46, delete "needed" and insert -- needed. --, therefor.

In Column 9, Lines 47-54, delete "Further, locations............adjusted accordingly." and insert the same as a new paragraph.

Signed and Sealed this
Fifth Day of June, 2012

David J. Kappos
*Director of the United States Patent and Trademark Office*